H. E. WILLSIE.
APPARATUS FOR UTILIZING SOLAR HEAT.
APPLICATION FILED JUNE 19, 1903.
1,130,870.
Patented Mar. 9, 1915.
3 SHEETS—SHEET 1.
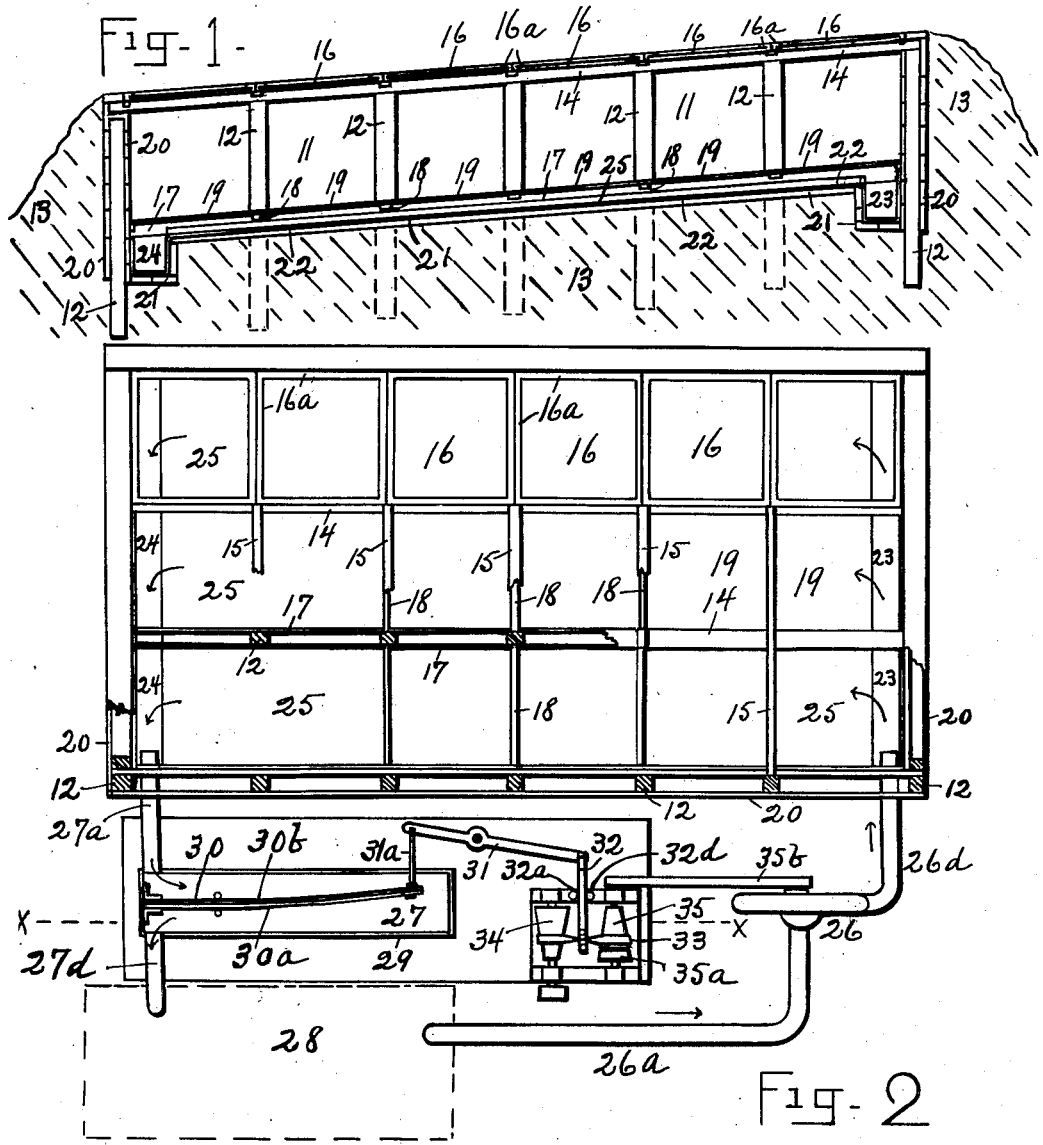
WITNESSES:
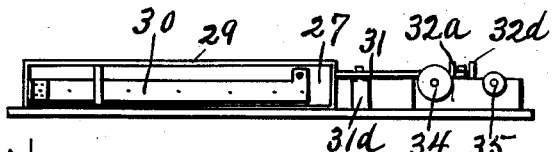
INVENTOR:
H. E. Willsie

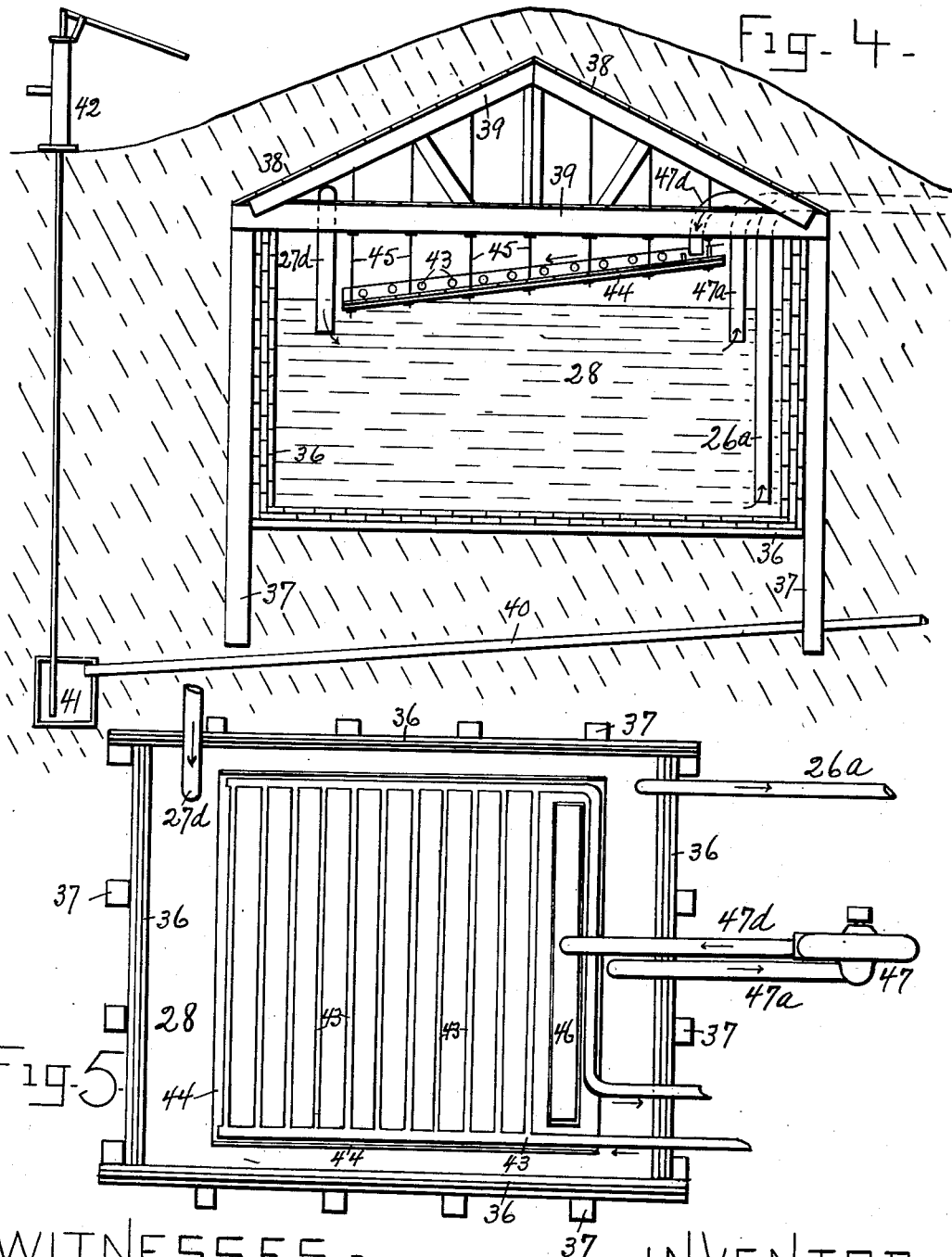

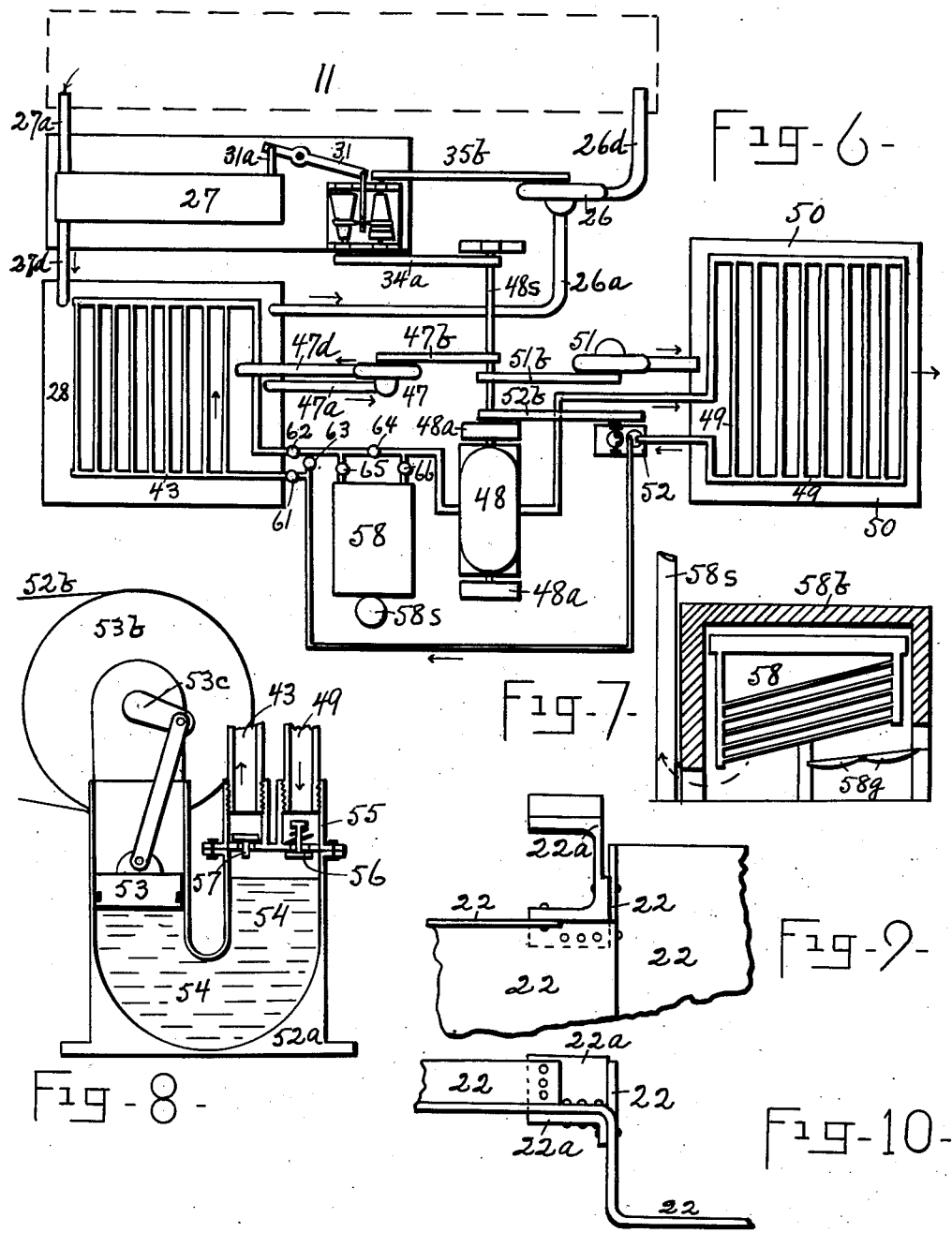

UNITED STATES PATENT OFFICE.

HENRY E. WILLSIE, OF CRANFORD, NEW JERSEY.

APPARATUS FOR UTILIZING SOLAR HEAT.

1,130,870.  Specification of Letters Patent.  Patented Mar. 9, 1915.

Application filed June 19, 1903. Serial No. 162,169.

*To all whom it may concern:*

Be it known that I, HENRY E. WILLSIE, a citizen of the United States, residing at Cranford, New Jersey, have invented new and useful Improvements in Apparatus for Utilizing Solar Heat, of which the following is a specification.

My invention relates to improvements in solar apparatus in which a vapor pressure generated by heat is used in a suitable engine to do useful work.

The objects of my invention are, to provide means for collecting and storing solar heat, for producing a vapor pressure from the stored heat, and for utilizing the vapor pressure to generate power. I attain these objects by the devices shown in the accompanying drawing, in which:

Figure 1 is a vertical cross section of the solar heat receiving compartment; Fig. 2, a plan view of the same with parts broken away to show the construction, and also showing the circulation pump with its thermostat regulator; Fig. 3, a vertical cross section on the line X—X; Fig. 4, a vertical cross section of the storage reservoir; Fig. 5, a plan view of the same; Fig. 6, a diagrammatical plan view of the entire apparatus; Fig. 7, a vertical cross section of the auxiliary boiler; Fig. 8, a vertical cross section of the feed pump; Fig. 9, a plan view showing a way to join the metal sheets in the receiving compartment; and Fig. 10, a vertical view of the same.

Similar characters refer to similar parts throughout the several views, and the arrows show the direction of movement of the fluids.

The solar heat receiving compartment consists of a series of inclosed liquid holding troughs covered by glass sheets and inclosed at the sides and bottom by poor conductors of heat. Wooden posts, 12, 12, set in the dry sand, 13, support the beams, 14, 14, in which are mortised the cross beams, 15, 15. The beams support the sheets of glass, 16, 16. These sheets of glass are secured in sashes, 16ª, 16ª, similar to window sashes. Lower down on the posts are secured the wooden strips, 17, 17, and the cross braces, 18, 18, upon which rest the sheets of glass, 19, 19. To the side posts are secured planks, 20, 20, and also suitable strips to support the outer edge of the glass. The east, west and south sides may with some advantage be inclosed by sheets of glass instead of by planks. It is evident that sheets of other transparent substances, as insoluble gelatin, celluloid, paper, etc., may be used in the place of glass.

Upon the inclined bed of sand lie the planks, 21, 21. The sheet iron, 22, which rests upon these planks is bent and connected so as to form the trough, 23, at the head of the incline, the trough, 24, at the foot of the incline, and the connecting inclined troughs, 25, 25. The sheets of iron forming the inclined troughs are bent up at the side edges and joined together at the head and foot of the incline by being riveted to castings as shown in Figs. 9 and 10, in which 22ª is the casting.

A centrifugal pump, 26, takes water through the pipe 26ª from the storage reservoir and discharges it through the pipe 26ᵈ into the trough 23, from which it is distributed to each of the inclined troughs 25, 25. The water running rapidly down these inclined troughs absorbs and collects the solar heat directly, or indirectly by taking the heat from the sheet iron.

The heated water collecting in trough 24 is carried by the pipe 27ª, to the thermostat regulator 27, and then by the pipe 27ᵈ into the storage reservoir 28. The thermostat regulator consists of a case 29 to which is secured at one end the thermostat bar 30. This bar is made by riveting a bar of steel, 30ª, to a bar of brass, 30ᵇ. The unequal expansion of these metals causes the free end of the thermostat bar to move according to the varying temperature of the surrounding water.

The free end of the thermostat bar is connected by the link 31ª, to the lever 31 mounted upon the pivotal support 31ᵈ. To the other end of the lever 31 is connected the bar 32 which passes between the guides 32ª, 32ᵈ and has belt shifting guides at its free end. A belt 33, passing between these belt guides, connects the cone pulleys 34, 35. These cone pulleys are of the usual construction. The part 35ª of the cone pulley 35 runs free on its shaft. The pulley 34 is driven by a belt 34ª from the engine shaft, and the pulley 35 is connected by the belt 35ᵇ to the pump 26. The operation of these services is such that the hotter the sun shines the more water is pumped onto the inclined troughs 25, 25 to carry the heat into the reservoir; and that when the sun stops shining, or the temperature of the water falls below a predetermined degree, the pump 26 stops because the belt 33 is shifted onto the idle pulley 35ª. When the water in the case 29 is cold as in starting the plant the thermostat should be disconnected from the lever until the water becomes warm.

The storage reservoir 28 may be efficiently constructed in several different ways. In the construction shown the planks 36, 36, supported by the piles 37, 37, are secured together so as to form a water tight reservoir. Between each layer of planks may be put canvas soaked in asphalt. The top of the reservoir is closed by planks 38, 38 supported by trusses, one of which is shown as 39. The reservoir is entirely surrounded by dry sand, or some other cheap, poor conductor of heat. If this insulating sand is several feet thick only a small percentage of the heat in the reservoir will be lost in one or two weeks. To drain this sand of moisture the drain pipe 40 is provided. Several of these drain pipes empty into the catch basin 41 from which the water is taken by the pump 42.

The liquid in the reservoir 28 is preferably water, and it is never heated above its boiling point. This boiling point may be raised by dissolving chlorid of calcium in the water. From the greater range of temperatures an increased efficiency is obtained, but the cost of the plant is more. To utilize the heat thus stored the water is made to give up its heat to sulfur dioxid, ammonia, or carbon dioxid inclosed in vaporizing pipes, and the vapor pressure thus obtained is transformed into motion by a suitable engine.

The vaporizing pipes 43, 43, rest upon the inclined platform 44 which is supported from the trusses by iron rods, as 45, 45. At the upper end of this platform is a trough 46. The centrifugal pump 47, driven by the belt 47ᵇ from the engine shaft, takes water through the pipe 47ª and discharges it through the pipe 47ᵈ into the trough 46. From this trough the warm water flows over and around the vaporizing pipes 43, 43 and back into the bulk of water. If the water fills the reservoir above the level of the pipes 43 it will not be necessary always to operate the pump 47, the pump 26 furnishing the mechanical circulation. The vapor (of $CO_2$, or $SO_2$, or $NH_3$) in the vaporizing pipes now having a high pressure passes to the engine 48 and operates it. This engine is of a reciprocating type now on the market.

The two vertical cylinders, the governor, and all the moving parts except the fly, or belt, wheels, 48ª, 48ª, are inclosed in a tight case partly filled with oil. This construction tends to prevent moisture being carried into the cylinder by the reciprocating rods. The engine rods should be packed with all the care that is now usual in ammonia compressors.

A vapor turbine may be used instead of a reciprocating engine.

The exhaust of the engine is conducted through a pipe to the condensing pipes 49, 49, laid in a covered shallow tank or basin 50. Cold water from a well or river is pumped into this tank 50 by the centrifugal pump 51 driven by the belt 51ᵇ from the engine shaft 48ˢ. This cool water reduces the temperature of the vapor in the pipes 49, 49, so that, with the back pressure from the engine, it liquefies. This liquid sulfur dioxid, or ammonia, is then pumped by the feed pump 52 back into the vaporizing pipes 43, 43. The feed pump is driven by the belt 52ᵇ from the engine shaft. The construction of this feed pump, shown in Fig. 8, is designed to prevent the leaking of vapor. The casing 52ª of the feed pump forms the cylinder in the shape of an upright U shaped tube. Or it may be considered as two upright cylinders connected at their lower ends by a passage. In one end of the U shaped cylinder works the reciprocating piston driven by the crank 53ᶜ which is rotated by the pulley 53ᵇ. The rest of the U shaped cylinder is nearly filled with mercury 54, or some other liquid not chemically affected by sulfur dioxid, ammonia, etc. The other end of the U shaped cylinder is tightly closed by the cap 55 provided with the valves 56 and 57. To this cap are secured the pipes 43 and 49. The liquid piston acts as a solid piston in pumping. The level of the pump should be below the level of the condensing pipes.

For starting the plant when the water in the reservoir is cold and for long periods without sunshine the auxiliary boiler 58 is provided. This boiler is of the "water tube" type shown in Fig. 7, in which 58ᵇ is the surrounding brick work, 58ᵍ the fire gate, and 58ˢ the smoke stack. The "water tubes" in this boiler are connected, as shown in Fig. 6, into the vaporizing pipe system. By closing the valves 61, 62, 64 and opening the valves 63, 65, 66 the boiler can be made to generate all the vapor pressure. With the valves 63, 64 closed and the others open the boiler may be used as a superheater. With the valves 63, 65, 66 closed and the others open the boiler is cut off the vaporizing system.

With the valves, pipes, and connections the practice now obtaining in refrigerating apparatus may be followed to advantage.

The invention as shown here is designed for furnishing power for electric light and power plants, refrigerating and ice making plants, for milling and pumping at mines, and for other purposes where large amounts of power are required.

The operation of the pumps and devices described requires only a small per cent. of the power generated.

For the sake of clearness the relative size of the different parts has not been shown in the drawings. The heat receiving compartment 11 and the storage reservoir 28 should be large enough for the engine to be run a week or more without sunshine.

It is evident that the water may be omitted and that air may be the medium to receive, store and transmit the solar heat.

By means of the described devices a solar energy plant may be constructed having a capacity of a thousand horse powers, or more, while heretofore the construction of solar motors has limited the capacity to about ten horsepower.

My invention is not restricted to the precise construction and arrangement shown, and it may be modified and rearranged without departing from the spirit of the invention.

Having now described my invention what I claim and desire to secure by Letters Patent, is:

1. The combination with a reservoir adapted to retain heat in a fluid of an inclined receptacle adapted to expose beneath a transparent cover a contained fluid to sunshine, said reservoir and said receptacle being in communication, means for flowing a fluid through said receptacle into said reservoir, mechanical means for returning the fluid to said receptacle, thermostatic control of the fluid through said receptacle, and an engine adapted to be operated by the heat in said solar heated fluid.

2. The combination with a reservoir adapted to retain heat in a fluid of a receptacle adapted to expose a contained fluid to solar heat, said reservoir and said receptacle being in communication, means for flowing said fluid through said receptacle, mechanical means for completing the circulation of said fluid through said reservoir and said receptacle, thermostatic control of the fluid through said receptacle, an engine adapted to be operated by the heat in said solar heated fluid, and auxiliary means for furnishing heat by the combustion of fuel.

3. In a solar apparatus, the combination of a solar heater adapted to heat a heat-receiving medium circulated therein, an insulated reservoir for the storage of the solar heated medium, connections between said heater and said reservoir, mechanical means for circulating the medium through said heater and said reservoir, means for regulating said circulation according to the temperature of the medium circulated, an engine, a feed pump and means for operating it, a vaporizer connected to said engine and to said feed pump, mechanical means for circulating the solar heated medium about said vaporizer, a condenser connected to said engine and to said feed pump, and means for circulating a cooling medium about said condenser, said engine, feed pump, vaporizer and condenser being adapted to contain and to operate with a fluid like sulfur dioxid.

4. In a solar apparatus, the combination of a solar heater adapted to heat a heat-receiving medium circulated therein, an insulated reservoir for the storage of the solar heated medium, connections between said heater and said reservoir, mechanical means for circulating the medium through said heater and said reservoir, and engine, a feed pump and means for operating it, a vaporizer connected to said engine and to said feed pump, mechanical means for circulating the solar heated medium about said vaporizer, a condenser connected to said engine and to said feed pump, means for circulating a cooling medium about said condenser, and an auxiliary means for heating the operating fluid by the combustion of fuel; said engine, feed pump, vaporizer and condenser being adapted to contain and to operate with a fluid like sulfur dioxid.

5. In a solar apparatus, the combination of a solar heater adapted to heat a heat-receiving medium circulated therein, an insulated reservoir for the storage of the solar heated medium, connections between said heater and said reservoir, a pump adapted to circulate the medium through said heater and said reservoir and means for operating the pump, a thermostat adapted to regulate the speed of said pump, an engine, a feed pump and means for operating it, a vaporizer connected to said engine and to said feed pump, mechanical means for circulating the solar heated medium about said vaporizer, a condenser connected to said engine and to said feed pump, and means for circulating a cooling medium about said condenser; said engine, feed pump, vaporizer and condenser being adapted to contain and to operate with a fluid like sulfur dioxid.

6. In an apparatus for utilizing solar energy, the combination of an engine, a feed pump operated by the engine, a solar heat receiving compartment, an insulated reservoir for solar heated liquid, pipes connecting said compartment to said reservoir, means for circulating the liquid through said compartment and said reservoir, vaporizing pipes adapted to contain a volatile liquid connected to said engine and to said feed pump, means for circulating the solar heated liquid about said vaporizing pipes, condensing pipes connected to said engine and to said feed pump, means for circulating cooling water about said condensing pipes, and an auxiliary fuel-combustion heated boiler connected to said vaporizing pipes.

7. In an apparatus for utilizing solar energy, the combination of an engine, feed pump operated by an engine, a solar heat receiving compartment, an insulated reservoir for solar heated liquid, pipes connecting said compartment to said reservoir, a pump driven from the engine for circulating the liquid through said compartment and said reservoir, a thermostat for regulating the speed of said pump, vaporizing pipes adapted to contain a volatile liquid connected to said engine and to said feed pump, means for circulating the solar heated liquid about said vaporizing pipes, condensing pipes connected to said engine and to said feed pump, and means for circulating cooling water about said condensing pipes.

8. In an apparatus for utilizing solar energy, the combination of an engine, a feed pump operated by an engine, a solar heat receiving compartment, an insulated reservoir for solar heated liquid, connections between said reservoir and said compartment, a motor driven pump for circulating liquid through said compartment and said reservoir, a thermostat for regulating the speed of said pump, vaporizing pipes adapted to contain a volatile liquid connected to said engine and to said feed pump, means for circulating the solar heated liquid about said vaporizing pipes, condensing pipes connected to said engine and to said feed pump, means for circulating cooling water about said condensing pipes, and an auxiliary fuel-combustion heated boiler connected to said vaporizing pipes.

9. The combination in one connected cycle of an engine, a feed pump with means for operating it, a vaporizer, a condenser with means for cooling it, and in another connected cycle a reservoir adapted to retain heat in a contained liquid, an inclined receptacle adapted to expose beneath a transparent cover a contained liquid to sunshine, a connection for flowing by gravity liquid from the lower end of said receptacle into said reservoir, means for circulating the solar heated liquid about said vaporizer, and mechanical means for returning the liquid to the upper end of said receptacle.

10. The combination with a reservoir adapted to retain heat in a contained liquid of an inclined receptacle adapted to expose beneath a transparent cover a contained liquid to sunshine, said reservoir and said receptacle being in communication, means for flowing by gravity said liquid through said receptacle into said reservoir, mechanical means for returning the liquid to said receptacle, and an engine adapted to be operated by the heat transferred from said solar heated liquid.

11. The combination with a reservoir adapted to retain heat in a contained liquid of a receptacle adapted to expose a contained liquid to solar heat, said receptacle and said reservoir being in communication, means for flowing by gravity said liquid through said receptacle, mechanical means for completing the circulation of said liquid through said reservoir and said receptacle, and an engine adapted to be operated by the heat in said solar heated liquid.

In testimony whereof, I have signed my name to this specification in the presence of two subscribing witnesses, this sixteenth day of June, 1903.

HENRY E. WILLSIE.

Witnesses:
 F. E. McCRARY,
 WALTER COX.